(12) United States Patent
Peters et al.

(10) Patent No.: US 8,619,776 B2
(45) Date of Patent: Dec. 31, 2013

(54) MULTIPROTOCOL OFFLOAD ENGINE ARCHITECTURE

(75) Inventors: Carl J. Peters, Pleasanton, CA (US); Agustinus Darmawan, San Jose, CA (US); James H. Galasso, Jr., Devon, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 475 days.

(21) Appl. No.: 12/972,889

(22) Filed: Dec. 20, 2010

(65) Prior Publication Data

US 2012/0155359 A1 Jun. 21, 2012

(51) Int. Cl.
*H04L 12/28* (2006.01)
(52) U.S. Cl.
USPC ......... 370/390; 370/395.5; 370/466; 370/469
(58) Field of Classification Search
None
See application file for complete search history.

(56) References Cited

U.S. PATENT DOCUMENTS

| | | | |
|---|---|---|---|
| 5,303,344 A | | 4/1994 | Yokoyama et al. |
| 7,430,617 B2 * | | 9/2008 | Walsh et al. ............ 709/247 |
| 7,536,622 B2 * | | 5/2009 | Leon et al. ............ 714/748 |
| 7,558,882 B2 * | | 7/2009 | Walsh et al. ............ 709/247 |
| 7,639,613 B1 | | 12/2009 | Ghannadian et al. |
| 2004/0174898 A1 | | 9/2004 | Kadambi et al. |
| 2005/0160345 A1 * | | 7/2005 | Walsh et al. ............ 714/776 |
| 2005/0182842 A1 * | | 8/2005 | Walsh et al. ............ 709/230 |
| 2010/0332676 A1 | | 12/2010 | Sugumar et al. |
| 2012/0155359 A1 | | 6/2012 | Peters et al. |

OTHER PUBLICATIONS

RFC 5740, by B. Adamson, C. Bormann, M. Handley and J. Macker, Nov. 2009 (http://tools.ietf.org/html/rfc5740).
U.S. Appl. No. 12/972,938 (45118-00355) Non-final Office Action dated Jan. 11, 2013, 16 pgs.

* cited by examiner

*Primary Examiner* — Alex Skripnikov
(74) *Attorney, Agent, or Firm* — Marsh Fischmann & Breyfogle LLP

(57) ABSTRACT

A device and method in which data transmissions to and from host processors in accordance with various protocols (e.g., TCP, UDP, FTP) are translated to and from NACK-Oriented Reliable Multicast (NORM) protocol data transmissions. A Multiprotocol Offload Engine (MOE) software architecture may perform the translations within a Network Interface Card (NIC) or Network Blade (NB) hardware platform. Moving the protocol translation processing from the host processors to the MOE hardware unit removes the protocol processing load from the host processor and significantly increases performance of data transmission among sources and sinks across a network layer.

22 Claims, 11 Drawing Sheets

MULTIPROTOCOL OFFLOAD ENGINE ARCHITECTURE

FIELD OF THE INVENTION

The present invention relates generally to communication of data over networks, and more particularly to offloading of data transmission protocol processing from a host processor.

BACKGROUND OF THE INVENTION

Many existing Wide Area Network (WAN) architectures allow individual data packet streams to compete for bandwidth and time across long haul networks that are data restrictive and have bottlenecks or congestion. Standard long haul packet switching methods generally involve a source and one or more sinks attempting to transmit (single or multi-cast) and receive data packets across often un-reliable WANs. In this regard, a number of protocols exist for the transmission of data among various source devices and sink devices over data networks. Source devices and sink devices may take various forms including, for example, a computer server or collection of computer servers, a desktop computer, a laptop computer, a smart phone, a personal digital assistant, or the like. Source devices and sink devices may generally be referred to herein as sources and sinks Examples of protocols used in transmitting and receiving data over data networks include Transmission Control Protocol/Internet Protocol (TCP/IP), User Datagram Protocol (UDP), and File Transfer Protocol (FTP).

FIG. 1 depicts an exemplary prior art unicast TCP transmission of data. As shown in FIG. 1, there is a source 110 from which data is transmitted and a sink 120 that receives the data. A source transmitter 112 and a source receiver 114 are associated with the source 110 to enable transmission and reception of data streams to and from a network layer 130. A sink transmitter 122 and a sink receiver 124 are associated with the sink 120 to enable transmission and reception of signals to and from the network layer 130. A processor at the source 110 (the source processor) processes data in accordance with a TCP protocol for the transmitter 112 to transmit to the network layer 130 for delivery by the network layer 130 to the sink receiver 124. The sink receiver 124 directs the received data to a processor that is part of the sink 120 (the sink processor) for processing thereby in accordance with the TCP protocol. When called for by the TCP protocol, the processor at the sink 120 generates return data that is transmitted by the sink transmitter 122 to the network layer 130 for delivery by the network layer 130 to the source receiver 114. The source receiver 114 receives the return data and directs it to the processor of the source 110 for processing thereby in accordance with the TCP protocol. In addition to handling processing the transmitted and received data in accordance with a TCP protocol, the source and sink processors also handle processing of instructions relating to applications executing on the respective source 110 and sink 120 devices.

FIG. 2 depicts an exemplary prior art unicast UDP transmission of data. As shown in FIG. 2, there is a source 210 from which data is transmitted and a sink 220 that receives the data. A source transmitter 212 and a source receiver 214 are associated with the source 210 to enable transmission and reception of data streams to and from a network layer 230. A sink transmitter 222 and a sink receiver 224 are associated with the sink 220 to enable transmission and reception of signals to and from the network layer 230. A processor at the source 210 (the source processor) processes data in accordance with a UDP protocol for the transmitter 212 to transmit to the network layer 230 for delivery by the network layer 230 to the sink receiver 224. The sink receiver 224 directs the received data to a processor that is part of the sink 220 (the sink processor) for processing thereby in accordance with the UDP protocol. In addition to handling processing the transmitted and received data in accordance with a UDP protocol, the source and sink processors also handle processing of instructions relating to applications executing on the respective source 210 and sink 220 devices.

FIG. 3 depicts an exemplary prior art multicast UDP transmission of data. As shown in FIG. 3, there is a source 310 from which data is transmitted and a plurality of sinks 320A-320N that receive the data. A source transmitter 312 and a source receiver 314 are associated with the source 310 to enable transmission and reception of data streams to and from a network layer 330. Respective sink transmitters 322A-322N and sink receivers 324A-324N are associated with respective sinks 320A-320N to enable transmission and reception of signals to and from the network layer 330. A processor at the source 310 (the source processor) processes data in accordance with a UDP protocol for the transmitter 312 to transmit to the network layer 330 for delivery by the network layer 330 to the sink receivers 324A-324N. The respective sink receivers 324A-324N direct the received data to respective processors that are part of each respective sink 320A-320N (the sink processors) for processing thereby in accordance with the UDP protocol. In addition to handling processing the transmitted and received data in accordance with a UDP protocol, the source and sink processors also handle processing of instructions relating to applications executing on the respective source 310 and sink 320A-320N devices.

FIG. 4 depicts an exemplary prior art unicast FTP transmission of data. As shown in FIG. 4, there is a source 410, a source-side data storage device 416, a sink 420, a sink-side data storage device 426, and a network layer 430. A source transmitter 412 and a source receiver 414 are associated with the source 410 to enable transmission and reception of data streams to and from a network layer 430. A sink transmitter 422 and a sink receiver 424 are associated with the sink 420 to enable transmission and reception of data streams to and from the network layer 430. A processor at the sink 420 (the sink processor) directs the sink transmitter 422 to send a request for a desired data file over the network layer 430. The request is received by the source receiver 414 and directed thereby to a processor at the source 410 (the source processor). The source processor processes the request and retrieves the requested data file for transmission in accordance with a FTP protocol by the transmitter 412 to the network layer 430 for delivery by the network layer 430 to the sink receiver 424. The sink receiver 424 directs the received data file to the sink processor for processing thereby in accordance with the FTP protocol. In addition to handling processing the transmitted and received data file in accordance with a FTP protocol, the source and sink processors also handle processing of instructions relating to applications executing on the respective source 410 and sink 420 devices.

SUMMARY OF THE INVENTION

Recently, another protocol referred to as Negative Acknowledgment Reliable Multicast (NORM) Transport Protocol has been developed. One example of the NORM protocol is specified in a document released for comment in November 2009 by the Naval Research Laboratory referred to as RFC 5740 and entitled "NACK-Oriented Reliable Multicast (NORM) Transport Protocol", the entire disclosure of which is hereby incorporated by reference herein. As described therein, the NORM protocol provides end-to-end reliable transport of bulk data objects or stream over generic IP multicast routing and forwarding services.

While the NORM protocol can be implemented on the host processors of source and sink devices to handle NORM protocol data transmissions among the devices over a network layer, doing so requires the host processors of the source and sink devices to devote processing time to the NORM protocol data transmissions thereby reducing the amount of processing time available to execute applications on the source and sink devices. Accordingly, the present invention provides a system and method by which data transmission using various protocols (e.g. TCP, UDP, FTP) among source and sink devices over a network is facilitated and made more reliable by translating the data transmission into a NORM protocol data transmission, transmitting the data over the network, and translating the data transmission from the NORM protocol back to another protocol (e.g., TCP, UDP, FTP). Such translations and communications may be performed by hardware units which offload protocol processing operations from the host processors of the source and sink devices and translate the data transmission to and from the NORM protocol. The hardware unit may be referred to herein as a Multiprotocol Offload Engine (MOE) and the MOE may include an MOE software architecture that implements the NORM protocol.

The MOE software architecture may apply the Naval Research Laboratory NACK-Oriented Reliable Multicast (NORM) (RFC 5740) within a Network Interface Card (NIC) or Network Blade (NB) hardware platform. Moving the protocol translation processing from the host processor to the hardware unit removes the protocol processing load from the host processor and significantly increases performance. Offloading the protocol translation processing onto hardware based multi-core processors contained within a NIC or NB significantly increases the communications throughput and improves the reliability of host based unicast and multicast UDP, TCP and FTP.

The MOE software architecture creates a very high speed, flexible and configurable network device that multiplexes, de-multiplexes, unicasts and multicasts UDP, TCP or FTP protocol data streams or any combination of these protocol configurations across LAN and/or WAN 10GE network infrastructures. The MOE may be architected to support full line rate of two 10GE interfaces or 40 Gbps bandwidth. The MOE software may be architected such that it can be applied to either network blades or workstation/server base NICs. The flexibility of the software architecture provides a powerful and flexible MOE device capable of surpassing existing TCP offload engines and satisfying numerous communications needs. The MOE can simultaneously operate across Local Area Networks (LAN) and/or Wide Area Networks (WAN) and support reliable unicast and/or multicast 10 giga-bit Ethernet data transmission. In addition, the MOE can implement the NORM Packet Forward Error Correction (PFEC) that can correct for lost packets without requiring additional network latency of requesting a re-transmission.

In one aspect, a networking device comprises a hardware unit interposed between a host processor and a network layer. The hardware unit includes at least one processor. The networking device also includes computer program instructions executable by the processor of the hardware unit. The computer program instructions may, for example, be stored on at least one memory included in the hardware device. The computer program instructions include a TCP module, a UDP module, an FTP module and a NORM module. The TCP module implements a TCP specification to transmit and receive data to and from the host processor. The UDP module implements a UDP specification to transmit and receive data to and from the host processor. The FTP module implements a FTP specification to transmit and receive data to and from the host processor. The NORM module implements a NORM protocol specification to transmit and receive data to and from the network layer. The NORM module further translates at least one of TCP, UDP and FTP data transmissions into NORM data transmissions and also further translates NORM data transmissions into at least one of TCP, UDP and FTP data transmissions.

In another aspect, a method for use in transmitting data between a host processor and a network layer includes the step of interposing a hardware unit in a communication path between the host processor and the network layer. The hardware unit may include at least one processor. The method also includes the step of executing computer program instructions with the at least one processor of the hardware unit. In this regard, the method may also include storing at least a portion of the computer program instructions on at least one memory included in the hardware unit. Execution of the computer program instructions implements a TCP module to transmit and receive data to and from the host processor in accordance with a TCP specification, implements a UDP module to transmit and receive data to and from the host processor in accordance with a UDP specification, implements a FTP module to transmit and receive data to and from the host processor in accordance with a FTP specification, and implements a negative-acknowledgment oriented reliable multicast (NORM) stack module to transmit and receive data to and from the network layer in accordance with a NORM protocol specification. execution of the computer program instructions also translates at least one of TCP, UDP and FTP data transmissions into NORM data transmissions and translates NORM data transmissions into at least one of TCP, UDP and FTP data transmissions.

Various refinements exist of the features noted in relation to the various aspects of the present invention. Further features may also be incorporated in the various aspects of the present invention. These refinements and additional features may exist individually or in any combination, and various features of the various aspects may be combined. These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

Figure 1:
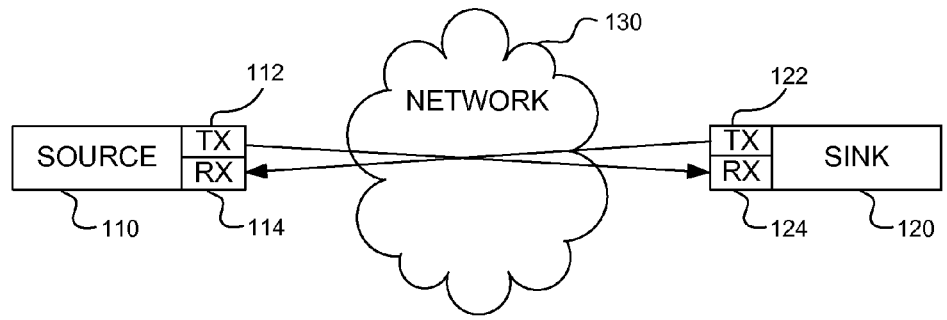
FIG. 1 depicts an exemplary prior art unicast TCP transmission of data among a source device and a sink device over a network layer.
Figure 2:
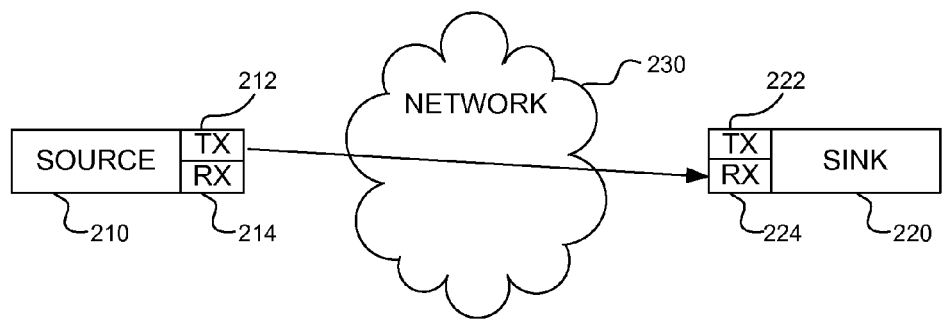
FIG. 2 depicts an exemplary prior art unicast UDP transmission of data among a source device and a sink device over a network layer.
Figure 3:
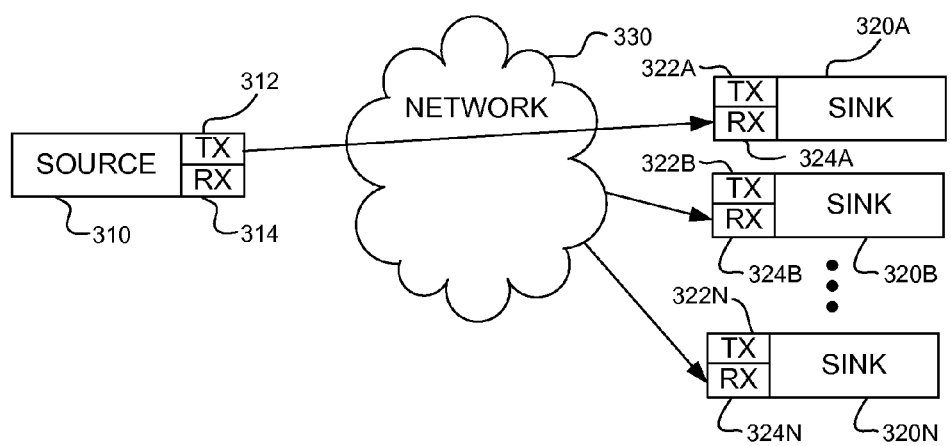
FIG. 3 depicts an exemplary prior art multicast UDP transmission of data among a source device and a plurality of sink devices over a network layer.
Figure 4:
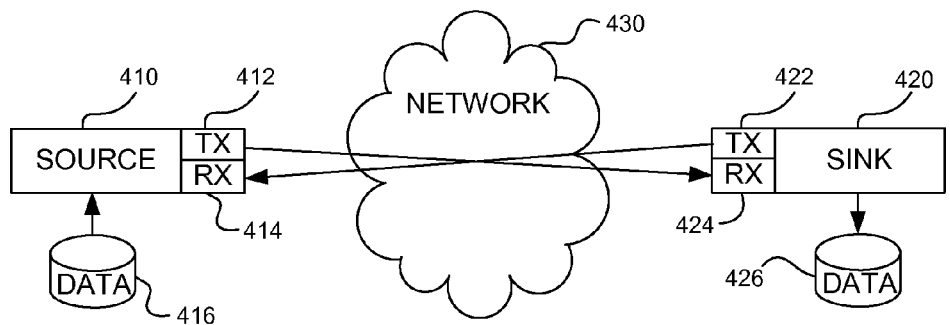
FIG. 4 depicts an exemplary prior art unicast FTP transmission of data among a source device and a sink device over a network layer.
Figure 5:
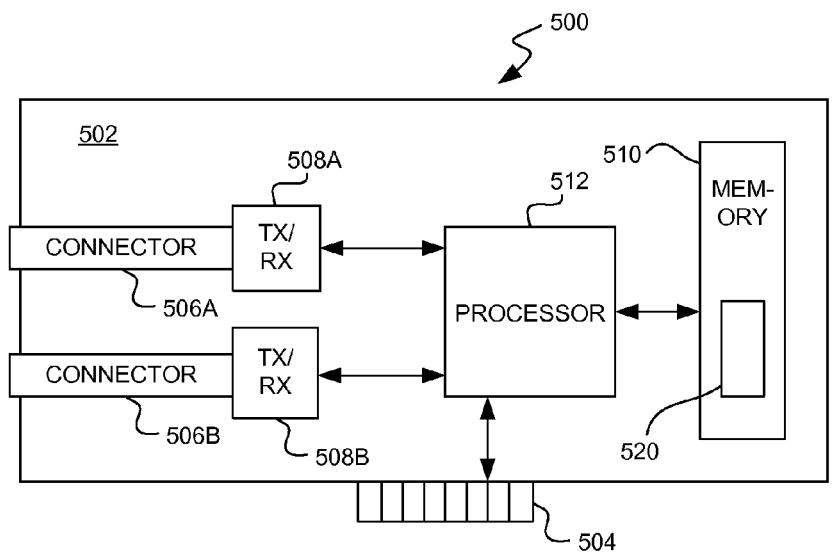
FIG. 5 depicts one embodiment of a MOE hardware device.

FIG. 5 depicts one embodiment of a MOE hardware device 500. The MOE hardware device 500 is implemented in the form of a commercial off-the-shelf (COTS) PCIe NIC, although in other embodiments MOE hardware devices may be implemented in other COTS and non-COTS forms including, for example, a network blade. The MOE hardware device 500 includes a circuit board 502, a PCI slot connector 504, two network cable connectors 506A and 506B (e.g., RJ-45 jacks), two network communications transceivers 508A and 508B coupled to the respective network cable connectors 506A and 506B, a memory 510, and a processor 512. The processor 512 is communicatively coupled (e.g. via electrically conductive traces on the circuit board 502) with the PCI slot connector 504, the transceivers 508A and 508B, and the memory 510. The processor 512 may be a multi-core processor such as, for example, an OCTEON® COTS MIPS64 Multi-Core Intelligent Communications & Network Processor available from Cavium Networks of Mountain View, Calif. In other embodiments, the processor 512 may comprise one or more single-core processors, a plurality of multi-core processors, or a combination of one or more single-core processors and one or more multi-core processors. Additionally, the MOE hardware device 500 may include one or more wireless network transceivers (not shown) and/or one or more optical network transceivers (not shown) communicatively coupled with the processor 512 for wireless transmission and/or optical transmission of data from/to the NOE hardware device 500.

The PCI slot connector 504 permits installation of the MOE hardware device 500 in a PCI slot of a source or sink device (e.g. a computer server). The processor 512 can thereby communicate with one or more processors in the source or sink device via a PCI system bus. Where the MOE hardware device 500 comprises a network blade or other COTS and non-COTS form, the MOE hardware device 500 may include an appropriate type of connector communicatively coupled with the processor 512 to enable connection to source and sink devices and communication with one or more processors in the source or sink devices.

The MOE hardware device 500 includes computer program instructions executable by said processor 512. The computer program instructions may be referred to herein as the MOE integrated software application 520 or just the MOE application 520. The MOE application 520 may be stored on the memory 510 of the MOE hardware device 500 and loaded into the processor 512 as needed prior to and/or during execution by the processor 512. When executed by the processor 512, the MOE application 520 enables the processor 512 to translate incoming data received from a network layer via the network cable connectors 506A-506B by the network communications transceivers 508A-508B from one protocol (e.g., NORM, TCP, UDP, FTP) into another protocol (e.g. (e.g., NORM, TCP, UDP, FTP). When executed by the processor 512, the MOE application 520 also enables the processor 512 to process outgoing data received from one or more source or sink host processors via PCI slot connector 504 for transmission by the transceivers 508A-508B to a network layer via the network cable connectors 506A-506B in accordance with a protocol (e.g., NORM, TCP, UDP, FTP).

Figure 6:
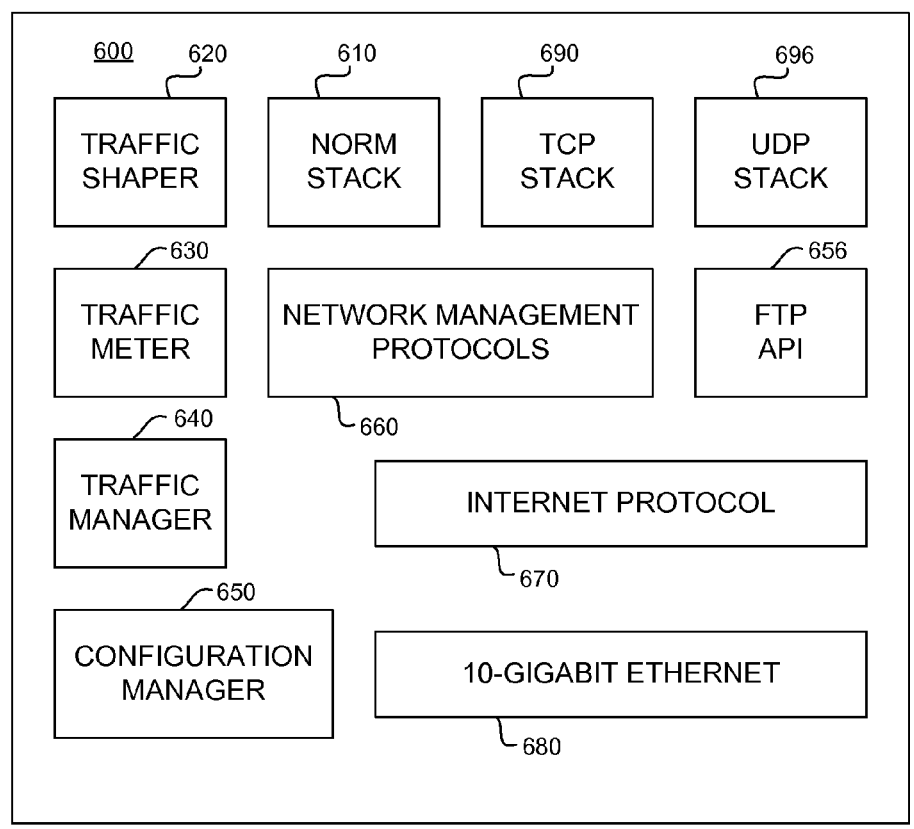
FIG. 6 depicts one embodiment of a MOE software architecture that may be included in a MOE hardware device.

FIG. 6 shows one embodiment of a MOE software architecture 600 of a MOE application such as MOE application 520 of FIG. 5. The MOE software architecture 600 includes a NORM stack module 610, a traffic shaper module 620, a traffic meter module 630, a traffic manager module 640, a configuration manager module 650, and a FTP application programming interface (API) module 656 all of which are unique to the MOE software architecture 600. The MOE software architecture 600 also includes several COTS modules such as for example, a network management protocols module 660, an internet protocol module 670 and a 10-gigabit Ethernet module 680, a TCP stack module 690 and a UDP stack module 696.

The NORM stack module 610 comprises computer program instructions executable by a processor such as processor 512 of the MOE hardware device 500 of FIG. 5. When executed, the instructions of the NORM stack module 610 enable the processor 512 to implement a NORM protocol specification such as, for example, a NORM protocol specification as specified in RFC 5740, to transmit and receive data between a network layer and one or more host processors of a source or sink device. The instructions comprising the NORM stack module 610 remain consistent from platform-to-platform (e.g. PCI NIC, network blade, etc.).

The traffic shaper module 620, traffic meter module 630, traffic manager module 640 and configuration manager module 650 comprise computer program instructions executable by a processor such as processor 512 of the MOE hardware device 500 of FIG. 5. When executed, the instructions of the traffic shaper module 620 enable the processor 512 to control bandwidth settings applicable to data transmissions from the hardware device 500. When executed, the instructions of the traffic meter module 640 enable the processor 512 to buffer incoming transmissions from a network layer. When executed, the instructions of the traffic manager module 650 enable the processor 512 to manage handling of incoming and outgoing data transmissions. When executed, the instructions of the configuration manager module 650 enable the processor 512 to set configuration settings of the hardware device 500. When executed, the instructions of the FTP API module 656 enable the processor 512 to implement a FTP protocol to transfer data files over a network layer from a source-side data storage device to a sink-side data storage device. The instructions comprising the traffic shaper module 620, traffic meter module 630, traffic manager module 640, and configuration manager module 650 may vary from platform-to-platform (e.g. PCI NIC, network blade, etc.) to enable the NORM stack module 610 to remain consistent regardless of the platform on which it is executed.

The other COTS modules of the MOE software architecture 600 (the network management protocol module 660, internet protocol module 670, 10-gigabit Ethernet module 680, TCP stack module 690 and UDP stack module 696) comprise computer program instructions executable by a processor such as processor 512 of the MOE hardware device 500 of FIG. 5. When executed, the instructions comprising the network management protocols module 660, internet protocol module 670 and a 10-gigabit Ethernet module 680 enable the processor 612 to handle necessary network management, receive and transmit data via internet protocol, and communicate via a 10-gigabit Ethernet connection to a network layer, respectively. When executed, the instructions comprising the TCP stack module 690 enable the processor to implement a TCP protocol to transmit and receive data between a network layer and one or more host processors of a source or sink device. When executed, the instructions comprising the UDP stack module 696 enable the processor to implement a UDP protocol to transmit and receive data between a network layer and one or more host processors of a source or sink device.

Figure 7:
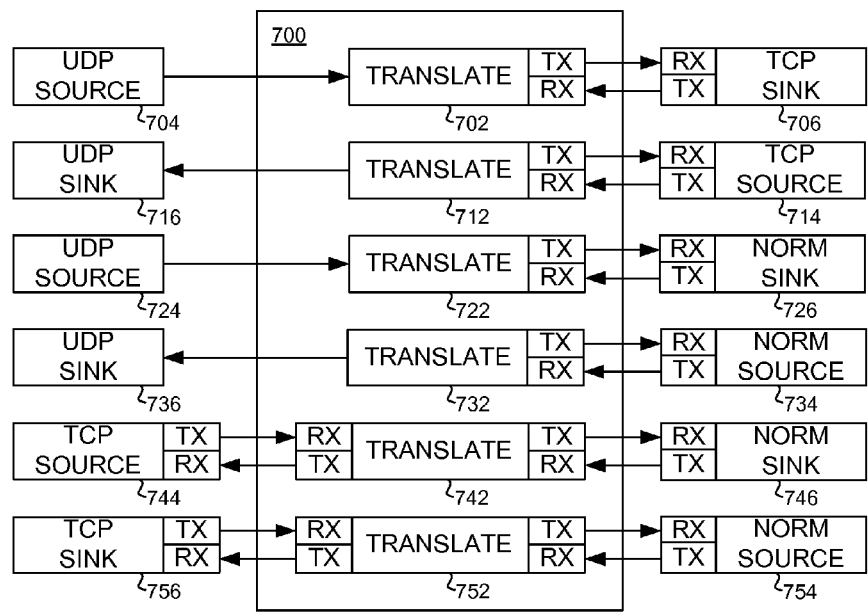
FIG. 7 depicts a number of protocol translations that may be enabled by a MOE hardware device.

FIG. 7 depicts a number of protocol translations that may be enabled by a MOE device such as MOE device 500 of FIG. 5 executing a MOE software application such as MOE software application of FIG. 6, which in FIG. 7 are collectively identified as MOE 700. The MOE 700 may translate individual protocols from one protocol to another within a network blade or NIC comprising the MOE 700. The MOE 700 may implement a first translation 702 that translates a UDP data transmission from a first UDP source 704 into a TCP data transmission to a first TCP sink 706. In this regard, the MOE 700 may, for example, utilize the UDP stack module 696 and TCP stack module 690 of the MOE architecture 600 of FIG. 6 in implementing the first translation 702. The MOE 700 may implement a second translation 712 that translates a TCP data transmission from a first TCP source 714 into a UDP data transmission to a first UDP sink 716. In this regard, the MOE 700 may, for example, utilize the UDP stack module 696 and TCP stack module 690 of the MOE architecture 600 of FIG. 6 in implementing the second translation 712. The MOE 700 may implement a third translation 722 that translates a UDP data transmission from a second UDP source 724 into a NORM data transmission to a first NORM sink 726. In this regard, the MOE 700 may, for example, utilize the UDP stack module 696 and NORM stack module 610 of the MOE architecture 600 of FIG. 6 in implementing the third translation 722. The MOE 700 may implement a fourth translation 732 that translates a NORM data transmission from a first NORM source 734 into a UDP data transmission to a second UDP sink 736. In this regard, the MOE 700 may, for example, utilize the UDP stack module 696 and NORM stack module 610 of the MOE architecture 600 of FIG. 6 in implementing the fourth translation 732. The MOE 700 may implement a fifth translation 742 that translates a TCP data transmission from a second TCP source 744 into a NORM data transmission to a second NORM sink 746. In this regard, the MOE 700 may, for example, utilize the TCP stack module 690 and NORM stack module 610 of the MOE architecture 600 of FIG. 6 in implementing the fifth translation 742. The MOE 700 may implement a sixth translation 752 that translates a TCP data transmission from a second NORM source 754 into a TCP data transmission to a second TCP sink 756. In this regard, the MOE 700 may, for example, utilize the TCP stack module 690 and NORM stack module 610 of the MOE architecture 600 of FIG. 6 in implementing the sixth translation 752.

Figure 8:
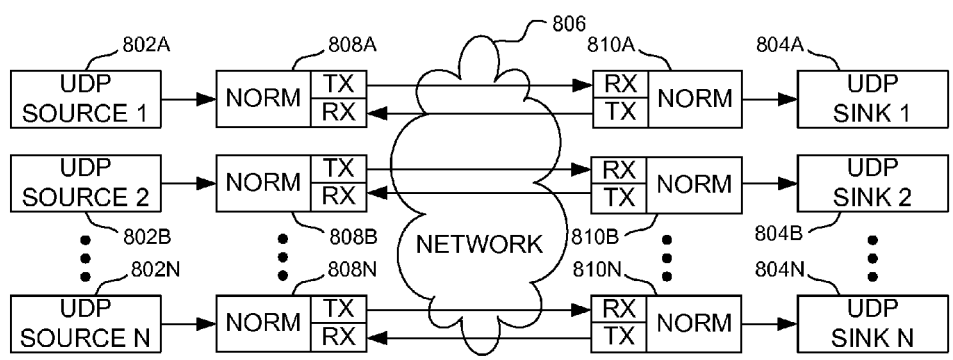
FIG. 8 depicts the use of MOEs to achieve reliable transmission of unicast UDP data streams from a plurality of UDP sources to a plurality of UDP sinks across a network.
Figure 9:
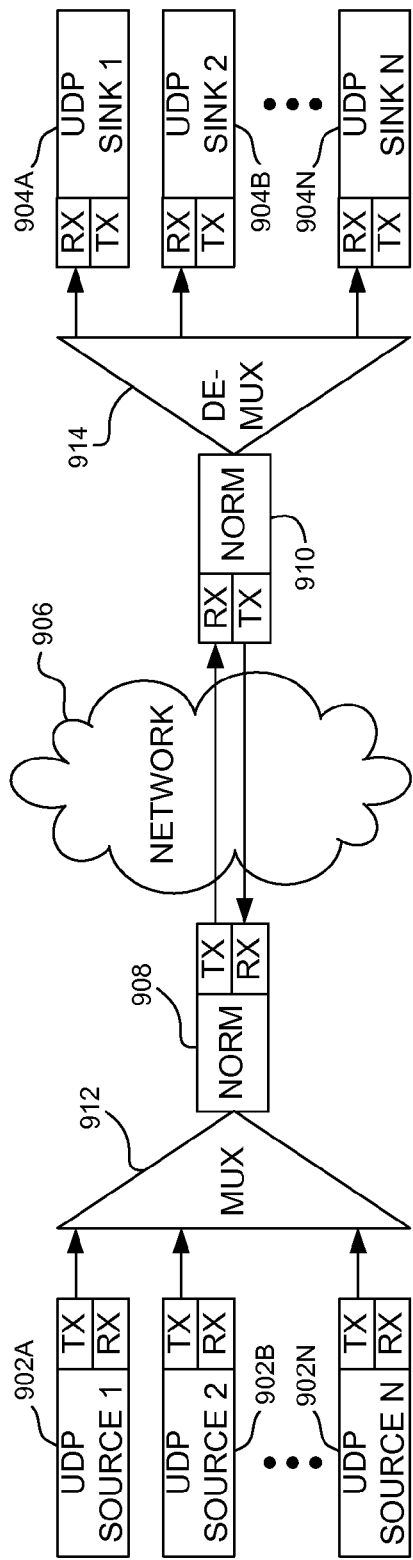
FIG. 9 depicts the use of MOEs and multiplexing/de-multiplexing to achieve reliable transmission of unicast UDP data streams from a plurality of UDP sources across a network to a plurality of UDP sinks.
Figure 10:
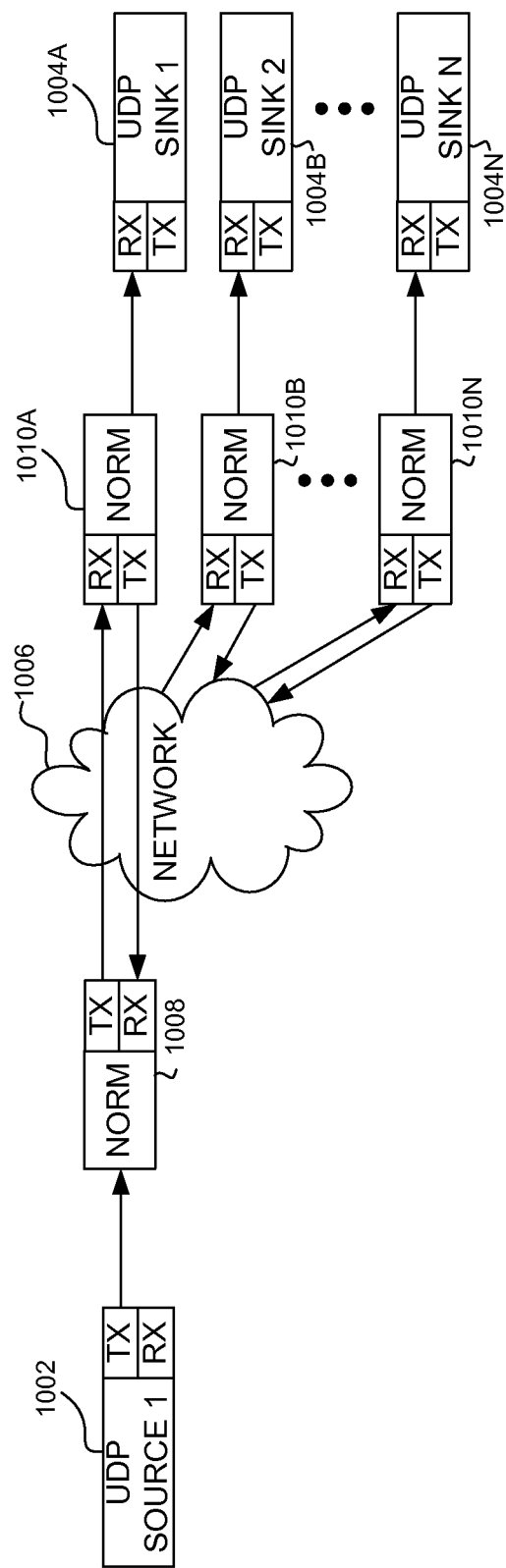
FIG. 10 depicts the use of MOEs to achieve reliable multicast transmission of a unicast UDP data stream from a UDP source across a network to a plurality of UDP sinks.

FIGS. 8, 9 and 10 depict how a MOE can be utilized to provide enhanced reliability for UDP data transmissions among UDP sources and sinks across WANs by translating the UDP transmissions from/to NORM transmissions. More specifically FIG. 8 depicts the use of MOEs to achieve reliable transmission of unicast UDP data streams from a plurality of UDP sources 802A-802N to a corresponding plurality of UDP sinks 804A-804N across a WAN 806. As shown in FIG. 8, a plurality of source-side MOEs 808A-808N may be disposed on the source sides of WAN 806 in the communication paths between respective UDP sources 802A-802N and WAN 806, and a plurality of sink-side MOEs 810A-810N may be disposed on the sink sides of WAN 806 in the communication paths between respective UDP sinks 804A-804N and WAN 806. In this regard, MOEs 808A-808N, 810A-810N may each comprise a network blade or NIC MOE device such as MOE device 500 of FIG. 5 executing MOE software such as MOE software application of FIG. 6. The source-side MOEs 808A-808N receive respective UDP data transmissions from the UDP sources 802A-802N, translate the data transmissions into a NORM data transmissions, and transmit the translated data transmissions in accordance with the NORM protocol over the WAN 806. The sink-side MOEs 810A-810N receive the respective NORM data transmissions from the WAN 806, translate the NORM data transmissions into UDP data transmissions, and deliver the UDP translated transmissions to respective UDP sinks 804A-804N. The sink-side MOEs 810A-810N may also generate Negative Acknowledgments (NACKs) when called for in accordance with the NORM protocol specification. When generated, NACKs are transmitted by the sink-side MOEs 810A-801N across the WAN 806 to respective source-side MOEs 808A-808N. When received, the source-side MOEs 808A-808N process the NACKs, and, when called for in accordance with the NORM protocol specification, generate retransmitted NORM data transmissions for transmission across the WAN 806 to respective sink-side MOEs 810A-810N.

FIG. 9 depicts the use of MOEs and multiplexing/de-multiplexing to achieve reliable transmission of unicast UDP data streams from a plurality of UDP sources 902A-902N to a corresponding plurality of UDP sinks 904A-904N across a WAN 906. As shown in FIG. 9, a source-side MOE 908 and a multiplexer 912 may be disposed on the source side of WAN 906 in the communication paths between respective UDP sources 902A-902N and WAN 906, and a sink-side MOE 910 and a de-multiplexer 914 may be disposed on the sink side of WAN 906 in the communication paths between respective UDP sinks 904A-904N and WAN 906. In this regard, MOEs 908B, 910 may each comprise a network blade or NIC MOE device such as MOE device 500 of FIG. 5 executing MOE software such as MOE software application of FIG. 6. The source-side multiplexer 912 receives respective UDP data transmissions from the UDP sources 902A-902N and multiplexes the UDP data transmissions into a single UDP data transmission that is directed to the source-side MOE 908. The source-side MOE 908 translates the multiplexed UDP data transmission into a multiplexed NORM data transmission and transmits the translated multiplexed data transmission in accordance with the NORM protocol over the WAN 906. The sink-side MOE 910 receives the multiplexed NORM data transmission from the WAN 906 and translates the multiplexed NORM data transmission into a multiplexed UDP data transmission. The multiplexed UDP data transmission is directed to the de-multiplexer 914. The de-multiplexer 914 de-multiplexes the multiplexed UDP data transmission into separate UDP data transmissions and delivers the UDP translated transmissions to respective UDP sinks 904A-904N. The sink-side MOE 910 may also generate a Negative Acknowledgment (NACK) when called for in accordance with the NORM protocol specification. When generated, the NACK is transmitted by the sink-side MOE 910 across the WAN 906 to the source-side MOE 908. When received, the source-side MOE 908 processes the NACK, and, when called for in accordance with the NORM protocol specification, generates a retransmitted NORM data transmission for transmission across the WAN 906 to the sink-side MOE 910.

FIG. 10 depicts the use of MOEs to achieve reliable multicast transmission of a unicast UDP data stream from a UDP source 1002 to a plurality of UDP sinks 1004A-1004N across a WAN 1006. As shown in FIG. 10, a source-side MOE 1008 may be disposed on the source side of WAN 1006 in the communication path between the UDP source 1002 and WAN 1006, and a plurality of sink-side MOEs 1010A-1010N may be disposed on the sink sides of WAN 1006 in the communication paths between respective UDP sinks 1004A-1004N and WAN 1006. In this regard, MOEs 1008, 1010A-1010N may each comprise a network blade or NIC MOE device such as MOE device 500 of FIG. 5 executing MOE software such as MOE software application of FIG. 6. The source-side MOE 1008 receives a UDP data transmission from the UDP sources 1002, translates the data transmission into a NORM data transmission, and transmits the translated data transmission in accordance with the NORM protocol over the WAN 1006. The sink-side MOEs 1010A-1010B receive the respective NORM data transmissions from the WAN 1006, translate the NORM data transmissions into UDP data transmissions, and deliver the UDP translated transmissions to respective UDP sinks 1004A-1004N. The sink-side MOEs 1010A-1010N may also generate NACKs when called for in accordance with the NORM protocol specification. When generated, the NACKs are transmitted by the sink-side MOEs 1010A-1010N across the WAN 1006 to the source-side MOE 1008. When received, the source-side MOE 1008 processes the NACKs, and, when called for in accordance with the NORM protocol specification, generates a retransmitted NORM data transmission for transmission across the WAN 1006 to each of the sink-side MOEs 1010A-1010N.

Figure 11:
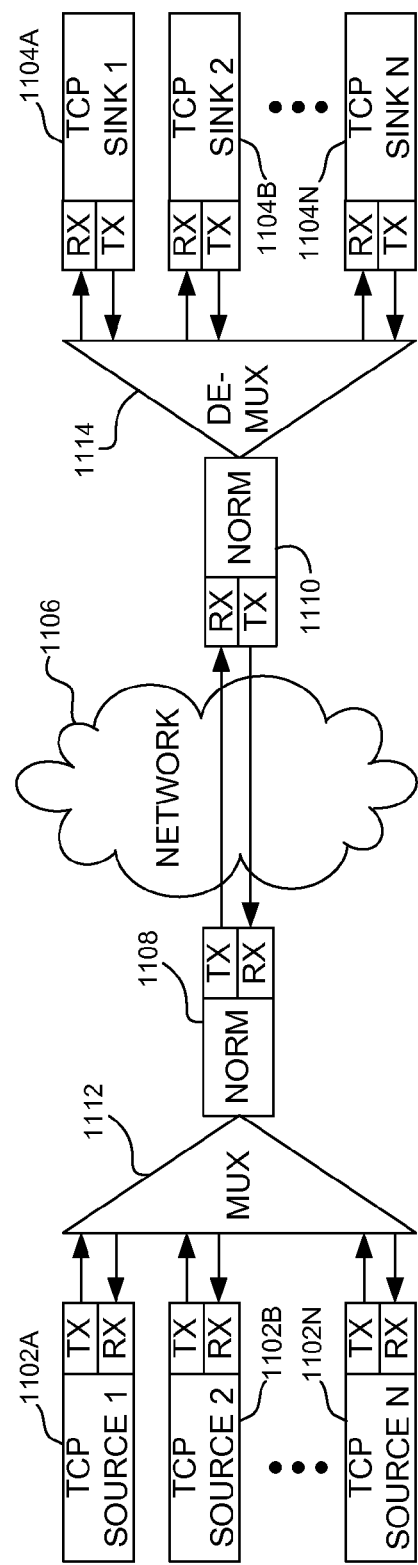
FIG. 11 depicts the use of MOEs and multiplexing/demultiplexing to achieve reliable transmission of unicast TCP data streams from a plurality of TCP sources across a network to a plurality of TCP sinks.

FIG. 11 depicts the use of MOEs and multiplexing/de-multiplexing to achieve reliable transmission of unicast TCP data streams from a plurality of TCP sources 1102A-1102N to a corresponding plurality of TCP sinks 1104A-1104N across a WAN 1106. As shown in FIG. 11, a source-side MOE 1108 and a multiplexer 1112 may be disposed on the source side of WAN 1106 in the communication paths between respective UDP sources 1102A-1102N and WAN 1106, and a sink-side MOE 1110 and a de-multiplexer 1114 may be disposed on the sink side of WAN 1106 in the communication paths between respective TCP sinks 1104A-1104N and WAN 1106. In this regard, MOEs 1108, 1110 may each comprise a network blade or NIC MOE device such as MOE device 500 of FIG. 5 executing MOE software such as MOE software application of FIG. 6. The source-side multiplexer 1112 receives respective TCP data transmissions from the TCP sources 1102A-1102N and multiplexes the TCP data transmissions into a single TCP data transmission that is directed to the source-side MOE 1108. The source-side MOE 1108 translates the multiplexed TCP data transmission into a multiplexed NORM data transmission and transmits the translated multiplexed data transmission in accordance with the NORM protocol over the WAN 1106. The sink-side MOE 1110 receives the multiplexed NORM data transmission from the WAN 1106 and translates the multiplexed NORM data transmission into a multiplexed TCP data transmission. The multiplexed TCP data transmission is directed to the de-multiplexer 1114. The de-multiplexer 1114 de-multiplexes the multiplexed TCP data transmission into separate TCP data transmissions and delivers the TCP translated transmissions to respective TCP sinks 1104A-1104N. The sink-side MOE 1110 may also generate a Negative Acknowledgment (NACK) when called for in accordance with the NORM protocol specification. When generated, the NACK is transmitted by the sink-side MOE 1110 across the WAN 1106 to the source-side MOE 1108. When received, the source-side MOE 1108 processes the NACK, and, when called for in accordance with the NORM protocol specification, generates a retransmitted NORM data transmission for transmission across the WAN 1106 to the sink-side MOE 1110.

Figure 12:
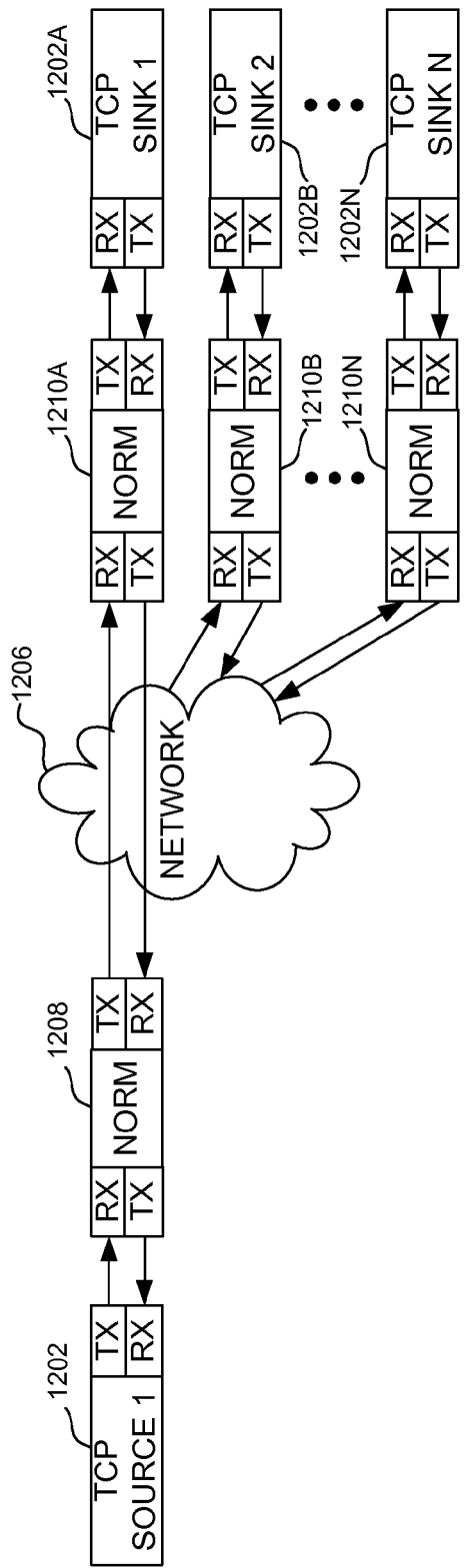
FIG. 12 depicts the use of MOEs to achieve reliable multicast transmission of a unicast TCP data stream from a TCP source across a network to a plurality of TCP sinks.

FIG. 12 depicts the use of MOEs to achieve reliable multicast transmission of a unicast TCP data stream from a TCP source 1202 to a plurality of TCP sinks 1204A-1204N across a WAN 1206. As shown in FIG. 12, a source-side MOE 1208 may be disposed on the source side of WAN 1206 in the communication path between the TCP source 1202 and WAN 1206, and a plurality of sink-side MOEs 1210A-1210N may be disposed on the sink sides of WAN 1206 in the communication paths between respective TCP sinks 1204A-1204N and WAN 1206. In this regard, MOEs 1208, 1210A-1210N may each comprise a network blade or NIC MOE device such as MOE device 500 of FIG. 5 executing MOE software such as MOE software application of FIG. 6. The source-side MOE 1208 receives a TCP data transmission from the TCP source 1202, translates the data transmission into a NORM data transmission, and transmits the translated data transmission in accordance with the NORM protocol over the WAN 1206 for delivery to each of the sink-side MOEs 1210A-1210N. The sink-side MOEs 1210A-1210B receive the respective NORM data transmissions from the WAN 1206, translate the NORM data transmissions into TCP data transmissions, and deliver the TCP translated transmissions to respective TCP sinks 1204A-1204N. The sink-side MOEs 1210A-1210N may also generate NACKs when called for in accordance with the NORM protocol specification. When generated, the NACKs are transmitted by the sink-side MOEs 1210A-1210N across the WAN 1206 to the source-side MOE 1208. When received, the source-side MOE 1208 processes the NACKs, and, when called for in accordance with the NORM protocol specification, generates a retransmitted NORM data transmission for transmission across the WAN 1206 to reach of each of the sink-side MOEs 1210A-1210N.

Figure 13:
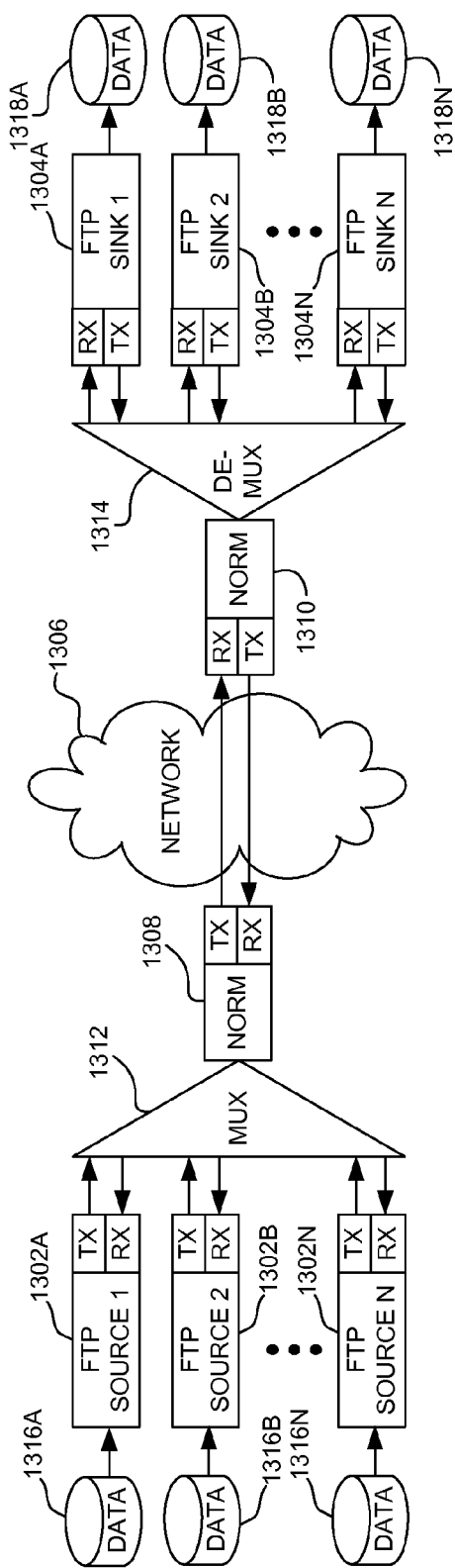
FIG. 13 depicts the use of MOEs and multiplexing/demultiplexing to achieve reliable transmission of unicast FTP data from a plurality of FTP sources across a network to a plurality of FTP sinks.

FIG. 13 depicts the use of MOEs and multiplexing/de-multiplexing to achieve reliable transmission of unicast FTP data from a plurality of FTP sources 1302A-1302N to a corresponding plurality of FTP sinks 1304A-1304N across a WAN 1306. As shown in FIG. 13, a source-side MOE 1308 and a multiplexer 1312 may be disposed on the source side of WAN 1306 in the communication paths between respective FTP sources 1302A-1302N and WAN 1306, and a sink-side MOE 1310 and a de-multiplexer 1314 may be disposed on the sink side of WAN 1306 in the communication paths between respective FTP sinks 1304A-1304N and WAN 1306. In this regard, MOEs 1308B, 1310 may each comprise a network blade or NIC MOE device such as MOE device 500 of FIG. 5 executing MOE software such as MOE software application of FIG. 6. The source-side multiplexer 1312 receives respective FTP data transmission retrieved by the FTP sources 1302A-1302N from respective source-side data storage devices 1316A-1316N and multiplexes the FTP data transmissions into a single FTP data transmission that is directed to the source-side MOE 1308. The source-side MOE 1308 translates the multiplexed FTP data transmission into a multiplexed NORM data transmission and transmits the translated multiplexed data transmission in accordance with the NORM protocol over the WAN 1306. The sink-side MOE 1310 receives the multiplexed NORM data transmission from the WAN 1306 and translates the multiplexed NORM data transmission into a multiplexed FTP data transmission. The multiplexed FTP data transmission is directed to the de-multiplexer 1314. The de-multiplexer 1314 de-multiplexes the multiplexed FTP data transmission into separate FTP data transmissions and delivers the FTP translated transmissions to respective FTP sinks 1304A-1304N for storage thereby on respective sink-side data storage devices 1318A-1318N. The sink-side MOE 1310 may also generate a NACK when called for in accordance with the NORM protocol specification. When generated, the NACK is transmitted by the sink-side MOE 1310 across the WAN 1306 to the source-side MOE 1308. When received, the source-side MOE 1308 processes the NACK, and, when called for in accordance with the NORM protocol specification, generates a retransmitted NORM data transmission for transmission across the WAN 1306 to the sink-side MOE 1310.

Figure 14:
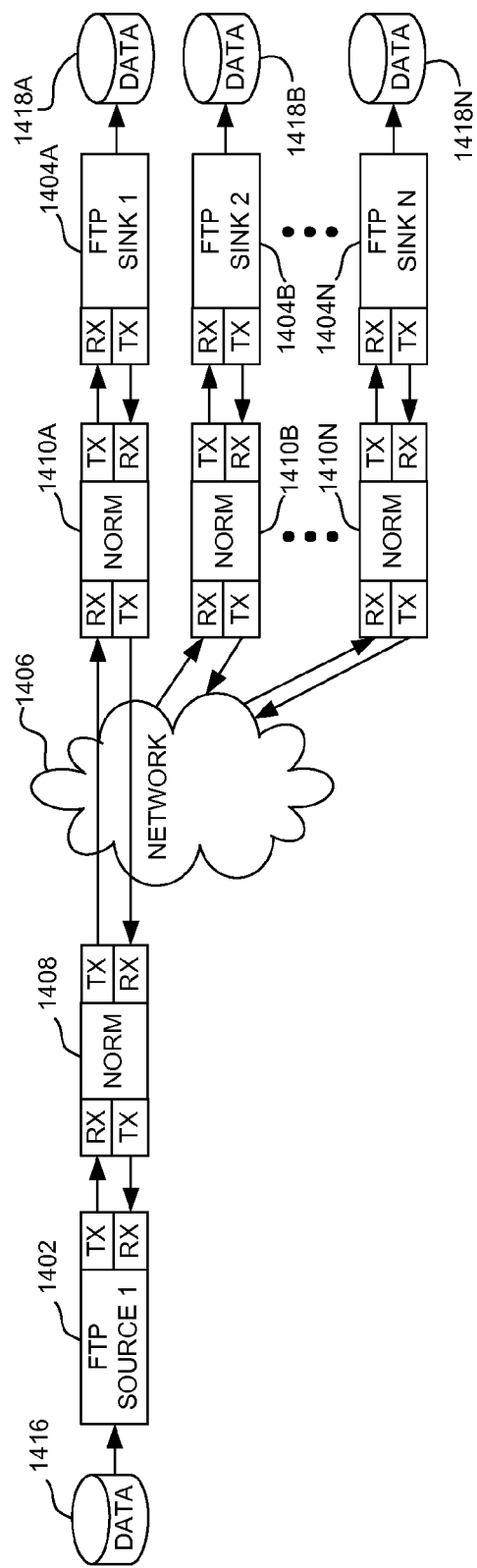
FIG. 14 depicts the use of MOEs to achieve reliable multicast transmission of a unicast FTP data from a FTP source across a network to a plurality of FTP sinks.

FIG. 14 depicts the use of MOEs to achieve reliable multicast transmission of a unicast FTP data stream from a FTP source 1402 to a plurality of FTP sinks 1404A-1404N across a WAN 1406. As shown in FIG. 14, a source-side MOE 1408 may be disposed on the source side of WAN 1406 in the communication path between the FTP source 1402 and WAN 1406, and a plurality of sink-side MOEs 1410A-1410N may be disposed on the sink sides of WAN 1406 in the communication paths between respective FTP sinks 1404A-1404N and WAN 1406. In this regard, MOEs 1408, 1410A-1410N may each comprise a network blade or NIC MOE device such as MOE device 500 of FIG. 5 executing MOE software such as MOE software application of FIG. 6. The source-side MOE 1408 receives a FTP data transmission retrieved by the TCP source 1402 from a source-side data storage device 1416, translates the data transmission into a NORM data transmission, and transmits the translated data transmission in accordance with the NORM protocol over the WAN 1406 for delivery to each of the sink-side MOEs 1410A-1410N. The sink-side MOEs 1410A-1410B receive the NORM data transmission from the WAN 1406, translate the NORM data transmission into FTP data transmissions, and deliver the FTP translated transmissions to respective FTP sinks 1404A-1404N for storage thereby on respective sink-side data storage devices 1418A-1418N. The sink-side MOEs 1410A-1410N may also generate NACKs when called for in accordance with the NORM protocol specification. When generated, the NACKs are transmitted by the sink-side MOEs 1410A-1410N across the WAN 1406 to the source-side MOE 1408. When received, the source-side MOE 1408 process the NACKs, and, when called for in accordance with the NORM protocol specification, generates a retransmitted NORM data transmission for transmission across the WAN 1406 to each of the sink-side MOEs 1410A-1410N.

Figure 15:
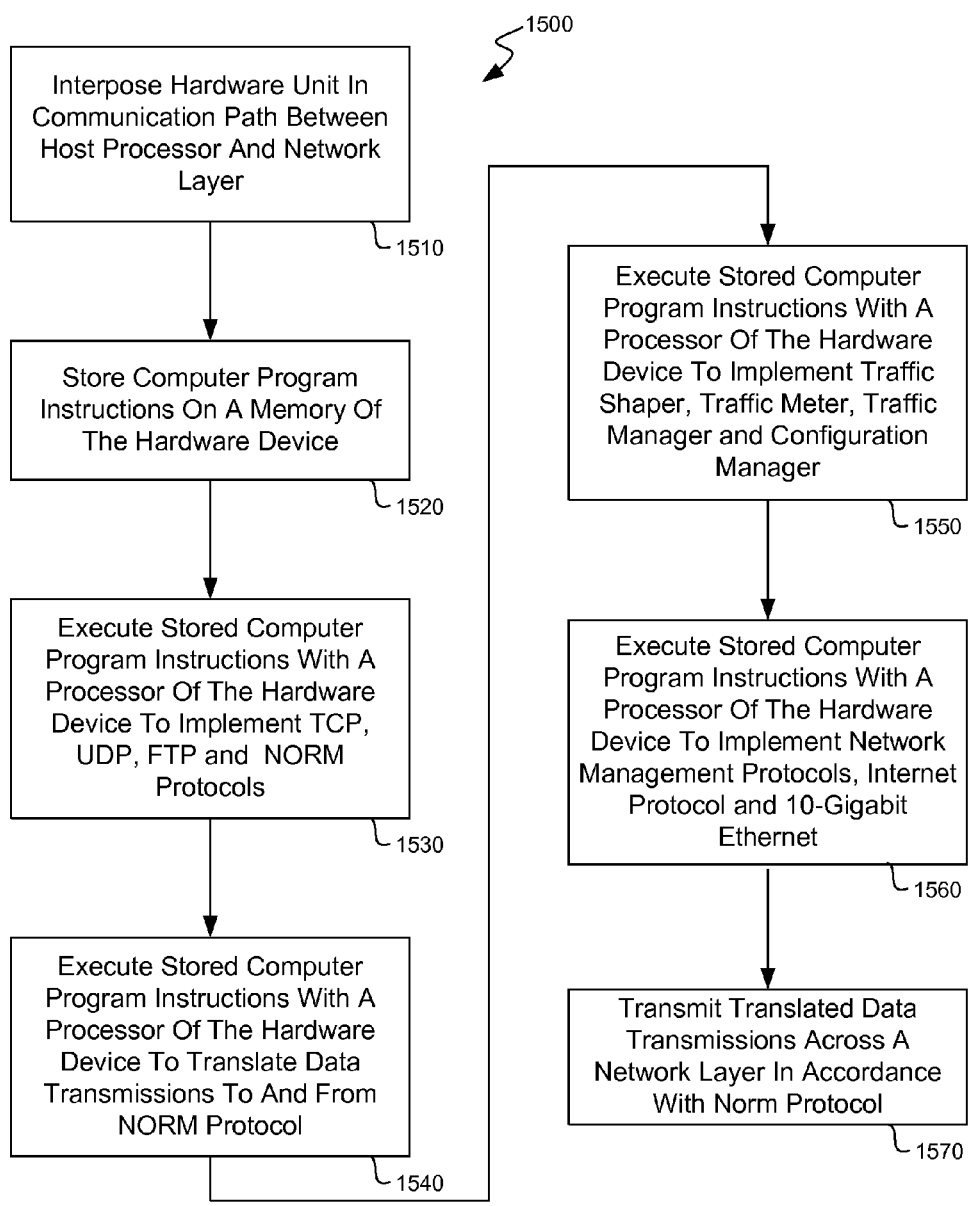
FIG. 15 depicts the steps included in one embodiment of a method for use in transmitting data between a host processor and a network layer involving the use of a MOE hardware device.

FIG. 15 shows steps included in one embodiment of a method 1500 for transmitting data between a host processor of a sink or source and a network layer involving the use of a MOE hardware unit 500 such as shown in FIG. 5. In step 1510, a hardware unit that includes at least one processor is interposed in a communication path between the host processor and the network layer. In this regard, the hardware unit may, for example, comprise a PCI NIC that is installed in an available PCI slot of a source or sink device having the host processor. In another exemplary embodiment, the hardware unit may, for example, comprise a network blade that is installed as part of a network blade source or sink device.

In step 1520, computer program instructions are stored on at least one memory included in the hardware unit. In this regard, step 1520 may be performed before and/or after step 1510 in which the hardware unit is interposed in the communication pathway between the host processor and the network layer.

In step 1530, the computer program instructions are executed with the at least one processor of the hardware unit to implement a TCP module to transmit and receive data to and from the host processor in accordance with a TCP specification, a UDP module to transmit and receive data to and from the host processor in accordance with a UDP specification, a FTP module to transmit and receive data to and from the host processor in accordance with a FTP specification, and a NORM stack module to transmit and receive data to and from the network layer in accordance with a NORM protocol specification.

In step 1540, the computer program instructions are executed with the at least one processor of the hardware unit to translate at least one of TCP, UDP and FTP data transmissions into NORM data transmissions and to translate NORM data transmissions into at least one of TCP, UDP and FTP data transmissions.

In step 1550, the computer program instructions are executed with the at least one processor of the hardware unit to implement one or more modules (e.g., a traffic shaper module, a traffic meter module, a traffic manager module, and/or a configuration manager module) that adapt the TCP module, UDP module, FTP module and the NORM module to the specific hardware unit and source or sink. In step 1560, the computer program instructions are executed with the at least one processor of the hardware unit to implement one or more COTS modules (e.g., a 10-giga-bit Ethernet module, an internet protocol (IP) module, and/or a network management protocol module). In step 1570, data translated into the NORM protocol specification is transmitted across the network layer in accordance with the NORM protocol specification.

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. A networking device comprising:
a hardware unit interposed between a host processor and a network layer, the hardware unit including at least one processor; and
computer program instructions executable by said at least one processor, said computer program instructions including:
a transmission control protocol (TCP) module, wherein said TCP module implements a TCP specification to transmit and receive data to and from the host processor;
a user datagram protocol (UDP) module, wherein said UDP module implements a UDP specification to transmit and receive data to and from the host processor;

a file transfer protocol (FTP) module, wherein said FTP module implements a FTP specification to transmit and receive data to and from the host processor; and a negative-acknowledgment oriented reliable multicast (NORM) module, wherein said NORM module implements a NORM protocol specification to transmit and receive data to and from the network layer;

wherein said NORM module further translates at least one of TCP, UDP and FTP data transmissions into NORM data transmissions; and wherein said NORM module further translates NORM data transmissions into at least one of TCP, UDP and FTP data transmissions.

2. The device of claim 1 further comprising at least one memory included in the hardware unit, the memory storing at least a portion of the computer program instructions.

3. The device of claim 1 wherein said at least one processor comprises a multi-core processor.

4. The device of claim 1 wherein said hardware unit comprises a network blade.

5. The device of claim 1 wherein said hardware unit comprises a network interface card.

6. The device of claim 1 wherein the NORM module simultaneously supports unicast transmission and multicast transmission.

7. The device of claim 1 wherein the NORM module implements packet forward error correction.

8. The device of claim 1 wherein the network layer comprises at least one of a wide area network (WAN) and a local area network (LAN).

9. The device of claim 1 wherein said computer program instructions executable by said at least one processor further include at least one of a 10-giga-bit Ethernet module, an internet protocol (IP) module, and a network management protocol module.

10. The device of claim 1 wherein said computer program instructions executable by said at least one processor further include at least one of a traffic shaper module, a traffic meter module, a traffic manager module, and a configuration manager module.

11. A method for use in transmitting data between a host processor and a network layer, said method comprising:
interposing a hardware unit in a communication path between the host processor and the network layer, the hardware unit including at least one processor; and
executing computer program instructions with the at least one processor of the hardware unit to:
implement a transmission control protocol (TCP) module to transmit and receive data to and from the host processor in accordance with a TCP specification;
implement a user datagram protocol (UDP) module to transmit and receive data to and from the host processor in accordance with a UDP specification;
implement a file transfer protocol (FTP) module to transmit and receive data to and from the host processor in accordance with a FTP specification;
implement a negative-acknowledgment oriented reliable multicast (NORM) stack module to transmit and receive data to and from the network layer in accordance with a NORM protocol specification;
translate at least one of TCP, UDP and FTP data transmissions into NORM data transmissions; and
translate NORM data transmissions into at least one of TCP, UDP and FTP data transmissions.

12. The method of claim 11 further comprising:
storing at least a portion of the computer program instructions on at least one memory included in the hardware unit.

13. The method of claim 11 wherein, the at least one processor of the hardware unit comprises a multi-core processor.

14. The method of claim 11 wherein, the hardware unit comprises a network blade.

15. The method of claim 11 wherein, the hardware unit comprises a network interface card.

16. The method of claim 11 further comprising:
transmitting data between the host processor and a single sink across the network layer in accordance with the NORM protocol specification.

17. The method of claim 16 wherein, the network layer comprises at least one of a wide area network (WAN) and a local area network (LAN).

18. The method of claim 11 further comprising:
transmitting data translated into the NORM data transmissions across the network layer in accordance with the NORM protocol specification.

19. The method of claim 18 wherein, the network layer comprises at least one of a wide area network (WAN) and a local area network (LAN).

20. The method of claim 11 further comprising:
executing computer program instructions included in the NORM stack module to implement packet forward error correction.

21. The method of claim 11 further comprising:
executing computer program instructions with the at least one processor of the hardware unit to implement at least one of a 10-giga-bit Ethernet module, an internet protocol (IP) module, and a network management protocol module.

22. The method of claim 11 further comprising:
executing computer program instructions with the at least one processor of the hardware unit to implement at least one of a traffic shaper module, a traffic meter module, a traffic manager module, and a configuration manager module.

* * * * *